United States Patent
Ueshima et al.

(10) Patent No.: US 7,235,748 B2
(45) Date of Patent: Jun. 26, 2007

(54) VIDEO GAME CONTROLLER AND GAME APPARATUS

(75) Inventors: Hiromu Ueshima, Kusatsu (JP); Koichi Makioka, Shiga (JP)

(73) Assignee: SSD Company Limited, Kusatsu-Shi, Shiga (JP)

( * ) Notice: Subject to any disclaimer, the term of this patent is extended or adjusted under 35 U.S.C. 154(b) by 0 days.

(21) Appl. No.: 11/104,881

(22) Filed: Apr. 13, 2005

(65) Prior Publication Data
US 2005/0230230 A1 Oct. 20, 2005

(30) Foreign Application Priority Data
Apr. 14, 2004 (JP) .............. 2004-118802

(51) Int. Cl.
*H01H 3/00* (2006.01)
(52) U.S. Cl. .......................... 200/18; 200/4
(58) Field of Classification Search ............... 200/5 A, 200/5 R, 6 A, 17 R, 18, 4, 332, 335, 339
See application file for complete search history.

(56) References Cited

U.S. PATENT DOCUMENTS

| | | | |
|---|---|---|---|
| 3,336,814 A | | 8/1967 | Holzer |
| 4,052,578 A | * | 10/1977 | Hoke .......................... 200/574 |
| 4,479,038 A | * | 10/1984 | Marhold et al. ............. 200/6 A |
| 4,514,600 A | * | 4/1985 | Lentz .......................... 200/5 R |
| 4,538,035 A | * | 8/1985 | Pool ............................. 200/6 A |
| 4,814,556 A | * | 3/1989 | Cole ........................ 200/38 R |
| 4,853,502 A | * | 8/1989 | Canipe ................... 200/61.89 |
| 5,731,558 A | * | 3/1998 | Kyoden ....................... 200/5 R |
| 5,799,223 A | * | 8/1998 | Konishi et al. .............. 396/538 |
| 5,883,690 A | * | 3/1999 | Meyers et al. .............. 345/161 |
| 6,070,205 A | | 5/2000 | Kato et al. |
| 6,162,124 A | * | 12/2000 | Hiraoka et al. ................ 463/38 |
| 6,259,433 B1 | * | 7/2001 | Meyers ........................ 345/161 |
| 6,271,490 B1 | * | 8/2001 | Miyata .................... 200/302.1 |
| 6,338,485 B1 | * | 1/2002 | Huettlinger ............. 273/148 B |
| 6,459,420 B1 | * | 10/2002 | Harris ......................... 345/161 |
| D478,590 S | * | 8/2003 | Hussaini et al. ........... D14/401 |

(Continued)

FOREIGN PATENT DOCUMENTS

GB 1000853 8/1965

(Continued)

OTHER PUBLICATIONS

Patent Abstracts of Japan, Publication No. 109-307790, Publication Date Nov. 17, 1998, 2 pages.

(Continued)

*Primary Examiner*—Michael Friedhofer
*Assistant Examiner*—Lisa Klaus
(74) *Attorney, Agent, or Firm*—Osha Liang LLP

(57) ABSTRACT

The game apparatus is provided with the cylindrical portion rotating with the axis on the side face of the base portion of the master control lever. Two projecting parts are sticking out from the columnar surface of the cylindrical portion. In addition, two leaf switches are provided corresponding to the master control lever. The leaf switch is turned on when the projecting part contacts with the contact member of the leaf switch while the master control lever is rotating. In this way, operation of the master control lever is detected by using the leaf switches rather than rotary switches.

11 Claims, 14 Drawing Sheets

U.S. PATENT DOCUMENTS

| | | | |
|---|---|---|---|
| 6,659,870 B2 * | 12/2003 | Sobota | 463/37 |
| 2002/0110246 A1 * | 8/2002 | Gosior et al. | 381/2 |
| 2003/0232648 A1 * | 12/2003 | Prindle | 463/40 |
| 2005/0031127 A1 * | 2/2005 | Gosior et al. | 381/2 |
| 2005/0169252 A1 * | 8/2005 | Riggs | 370/352 |

FOREIGN PATENT DOCUMENTS

| | | |
|---|---|---|
| JP | UM-3050468 | 7/1998 |
| JP | A-10-307790 | 11/1999 |

OTHER PUBLICATIONS

European Search Report dated Jun. 29, 2005, 3 pages.

* cited by examiner

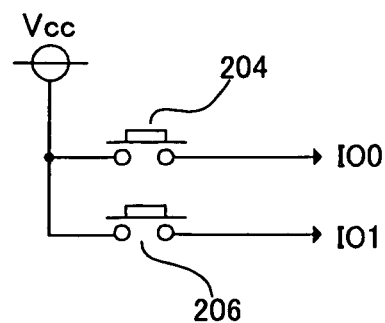
Fig. 14A
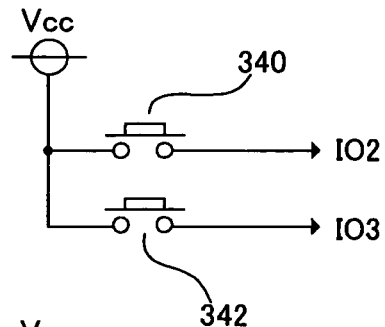
Fig. 14B
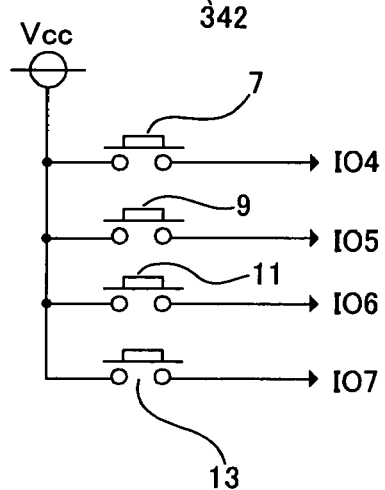
Fig. 14C
Fig. 15
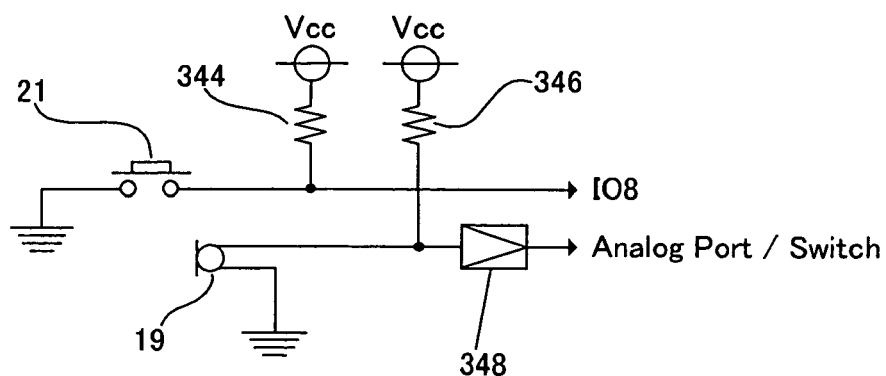

VIDEO GAME CONTROLLER AND GAME APPARATUS

This application claims foreign priority based on Japanese Patent application No. 2004-118802, filed Apr. 14, 2004, the contents of which is incorporated herein by reference in its entirety.

BACKGROUND OF THE INVENTION

1. Field of the Invention

The present invention is related to a video game controller having an operation lever, and related arts thereof.

2. Description of the Related Art

A controller used by connecting to a video game apparatus for playing a simulation game of driving a train is described in Japanese Utility Model No. 3050468. The controller is provided with a master control lever which can rotate within a vertical plane, and a brake lever which can rotate within a horizontal plane.

It is possible to control speed of a train displayed on a television monitor in a stepwise manner by operating the master control lever. In addition, it is possible to brake the train displayed on the television monitor in a stepwise manner by operating the brake lever.

Rotary switches which are switched according to the operation of the corresponding lever are attached, in the controller, respectively for the master control lever and the brake lever.

In this way, the operation of the lever is detected by the rotary switch.

SUMMARY OF INVENTION

It is an object of the present invention to provide a video game controller which can detect operation of a lever without using the rotary switch, and the related techniques thereof.

In accordance with the first aspect of the present invention, a video game controller comprises a lever which has an axis portion operable to rotate around an axis line; a rotating body which rotates around the axis line with the axis portion, the rotating body having at least one projecting part; and at least one switch arranged in a vertical direction of the axis line of the axis portion, the switch having a first metal plate and a second metal plate, wherein a tip end portion of the first metal plate and a tip end of the second metal plate constitute contact portions of the switch, and a base end portion of the first metal plate and a base end portion of the second metal plate are secured in a state that they are electrically insulated with each other, and the switch is arranged in a manner that the contact portions of the switch contact with each other only when the tip end portion of the first metal plate of the switch comes in contact with the projecting part of the rotating body.

In accordance with this configuration, the contact portions of the switch come into contact with each other since the switch constructed by the first metal plate and the second metal plate contact with the projecting part rotating with the axis of the lever. In this way, operation of the lever is detected in accordance with on/off information of the switch accompanying with the rotation of the lever without using a rotary switch.

In above video game controller, the first metal plate of the switch has a contact member attached to the tip end portion on an opposite side of the contact portion, the switch is arranged in a manner that the contact portions of the switch contact with each other only when the contact member of the switch come in contact with the projecting part of the rotating body, and the projecting part of the rotating body sticks out from the rotating body and is formed with curved corners. In this way, it is possible to unctuously turn the switch on and off.

In accordance with the second aspect of the present invention, a video game controller comprises a lever which has an axis portion operable to rotate around an axis line; a rotating body which rotates around the axis line with the axis portion, the rotating body having at least one projecting part which sticks out from a reference surface of the rotating body and has a prescribed height from the reference surface and a prescribed width in a rotation direction around the axis portion; and at least one switch arranged in a vertical direction of the axis line of the axis portion, the switch having a first metal plate and a second metal plate wherein a tip end portion of the first metal plate and a tip end portion of the second metal plate constitute contact portions of the switch, and a base end portion of the first metal plate and a base end portion of the second metal plate are secured in a state that they are electrically insulated with each other, and the prescribed height of the projecting part is higher than an interval between the contact portions of the switch.

In accordance with this configuration, the prescribed height of the projecting part is certain distance higher than an interval between the contact portions of the switch. Therefore, the contact portions of the switch come into contact with each other since the switch constructed by the first metal plate and the second metal plate contact with the projecting part rotating with the axis portion of the lever. In this way, operation of the lever can be detected in accordance with on/off information of the switch accompanying with the rotation of the lever without using a rotary switch. The prescribed height of the projecting part is the certain distance higher than the interval between the contact portions of the switch. Therefore, in case where the axis portion oscillates, it is possible to make the contact portions of the switch have contact with each other without fail.

In above video game controller, the first metal plate of the switch has a contact member attached to the tip end portion on an opposite side of the contact portion, the contact member contacts with the projection part of the rotating body, and the projecting part of the rotating body sticks out from the rotating body and is formed with curved corners. In accordance with this configuration, it is possible to unctuously turn the switch on and off.

The above video game controller can further comprise a processor which generates a video signal and an audio signal in accordance with a game program. In accordance with this configuration, since the video game controller include the processor, it is possible to reduce the cost and improve the convenience of the users as compared with the case where a game apparatus and a video game controller are separately provided.

The above video game controller can further comprise a microphone for inputting player's voice. In accordance with this configuration, it is possible to enhance game contents since the processor can perform process in response to microphone input.

The above video game controller can be provided with a plurality of switches, and the rotating body can provided with a plurality of projecting parts corresponding to the plurality of switches. In accordance with this configuration, it is possible to detect the operation of the lever in more detail.

In accordance with the third aspect of the present invention, a game apparatus which displays a scenery seen from a driver's seat of a running train on a television monitor, the game apparatus comprises a processor which generates and outputs a video signal and an audio signal to the television monitor in accordance with a game program; a lever which is arranged so as to be rotatable; and a switch which is pressed by a player and makes the processor perform a prescribed process, wherein the processor generates the video signal corresponding to a signal output in response to an operation of the lever.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 14A is a circuit diagram of the master control switch unit 308 of FIG. 13.

FIG. 14B is a circuit diagram of the brake switch unit 310 of FIG. 13.

FIG. 14C is a circuit diagram of the switch unit 312 of FIG. 13.

FIG. 15 is a circuit diagram of the microphone unit 314 of FIG. 13.

DESCRIPTION OF THE PREFERRED EMBODIMENTS

In what follows, an embodiment of the present invention will be explained in conjunction with the accompanying drawings. Meanwhile, like references indicate the same or functionally similar elements throughout the respective drawings, and therefore redundant explanation is not repeated.

Figure 1:
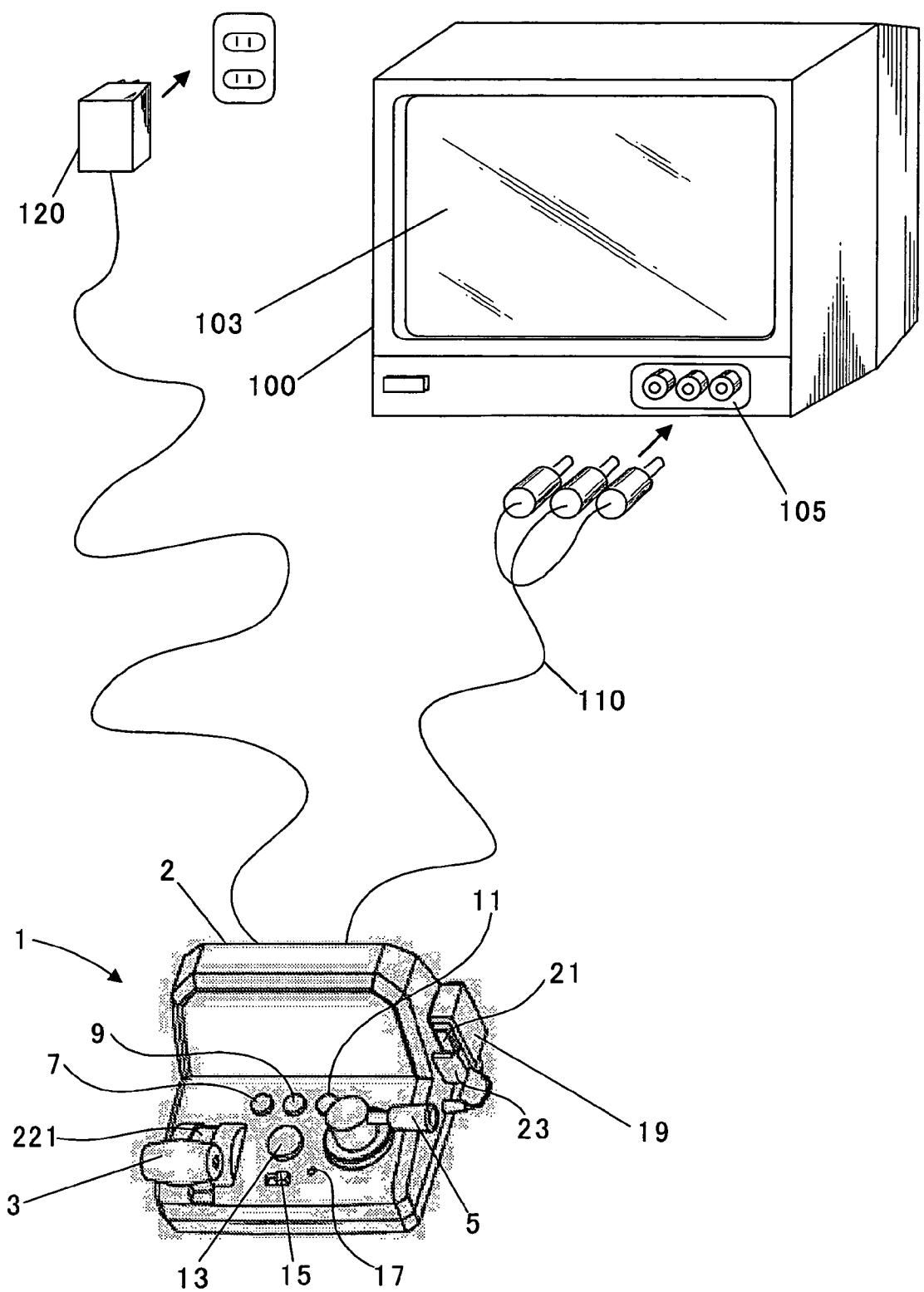
FIG. 1 is a view showing the overall configuration of a game system in accordance with the embodiment of the present invention.

FIG. 1 is a view showing the overall configuration of a game system in accordance with the embodiment of the present invention. As illustrated in FIG. 1, this game system includes a game apparatus 1 and a television monitor 100. The game apparatus 1 displays images such as rails and scenery seen from a driver's seat on the television monitor 100, and performs a simulation game of driving a train. In this embodiment, the game apparatus 1 also serves as a video game controller, however this will be explained later.

The television monitor 100 is provided with a screen 103 on its front and an AV terminal 105 below the screen 103. An AV terminal 326 (to be explained later) of the game apparatus 1 is connected to the AV terminal 105 of the television monitor 100 by an AV cable 110. A direct current power voltage is applied to the game apparatus 1 by an AC adaptor 120. Alternatively, instead of using the AC adapter 120, the game apparatus 1 can be supplied with the direct current power voltage from a battery (not shown).

Figure 2:
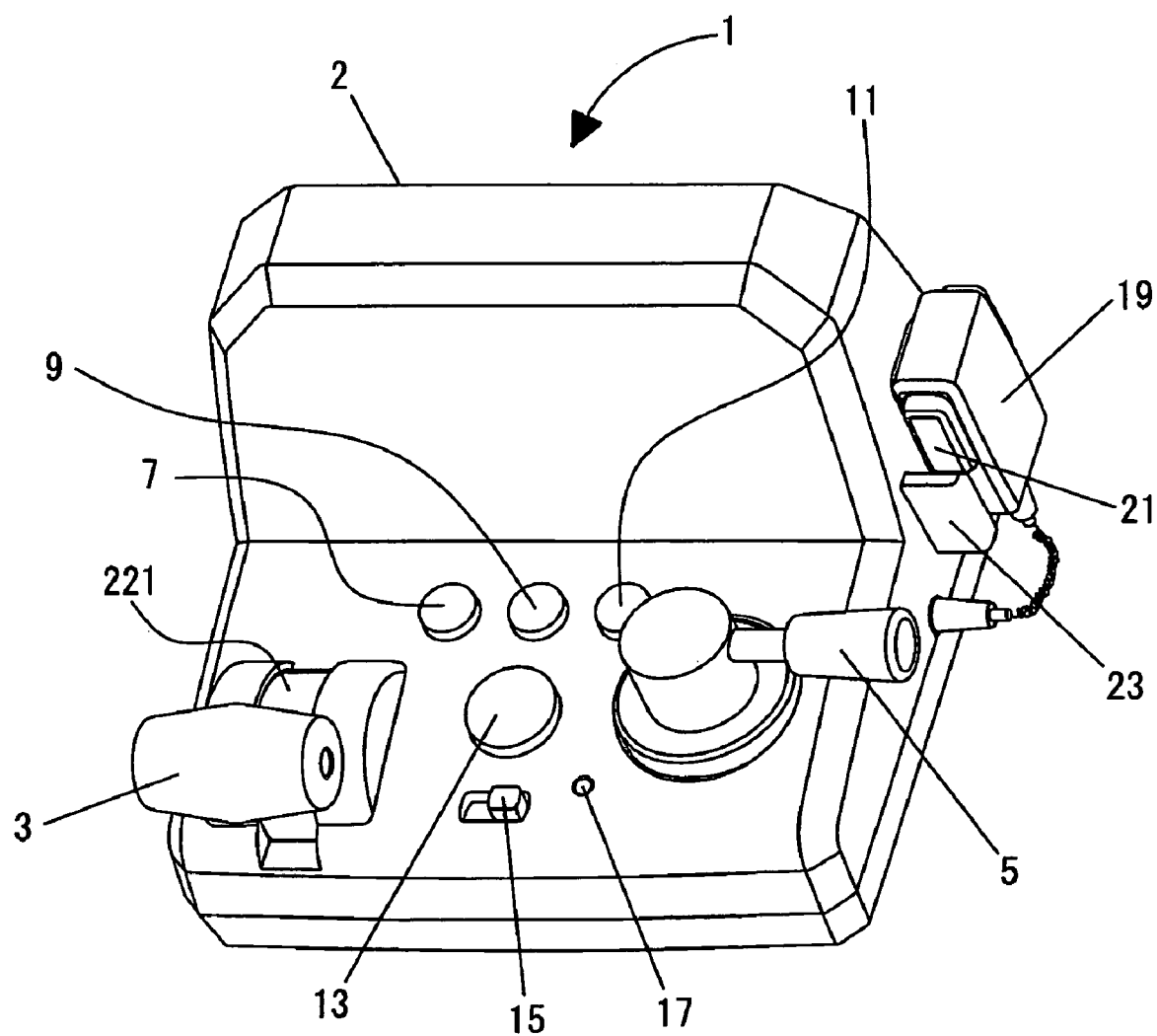
FIG. 2 is a perspective view of the game apparatus 1 of FIG. 1.

FIG. 2 is a perspective view of the game apparatus 1 of FIG. 1. As illustrated in FIG. 2, the game apparatus 1 is provided with a T-shaped master control lever 3 on the left-hand of an upper surface of a housing 2 of the game apparatus 1 in a manner that the master control lever 3 can rotate within a vertical plane. A brake lever 5 is attached on the right-hand of the upper surface of the housing 2 of the game apparatus 1 in a manner that the brake lever 5 can rotate within a horizontal plane.

In addition, the game apparatus 1 is provided, around the center of the upper surface of the housing 2, with a light switch 7, a wiper switch 9, a door switch 11, an alarm whistle switch 13, a power switch 15 and a reset switch 17 for resetting a system. Furthermore, a microphone holder 23 is attached on the right side surface of the housing 2, and a microphone 19 is held by the microphone holder 23. The microphone 19 is provided with a microphone switch 21.

Figure 3:
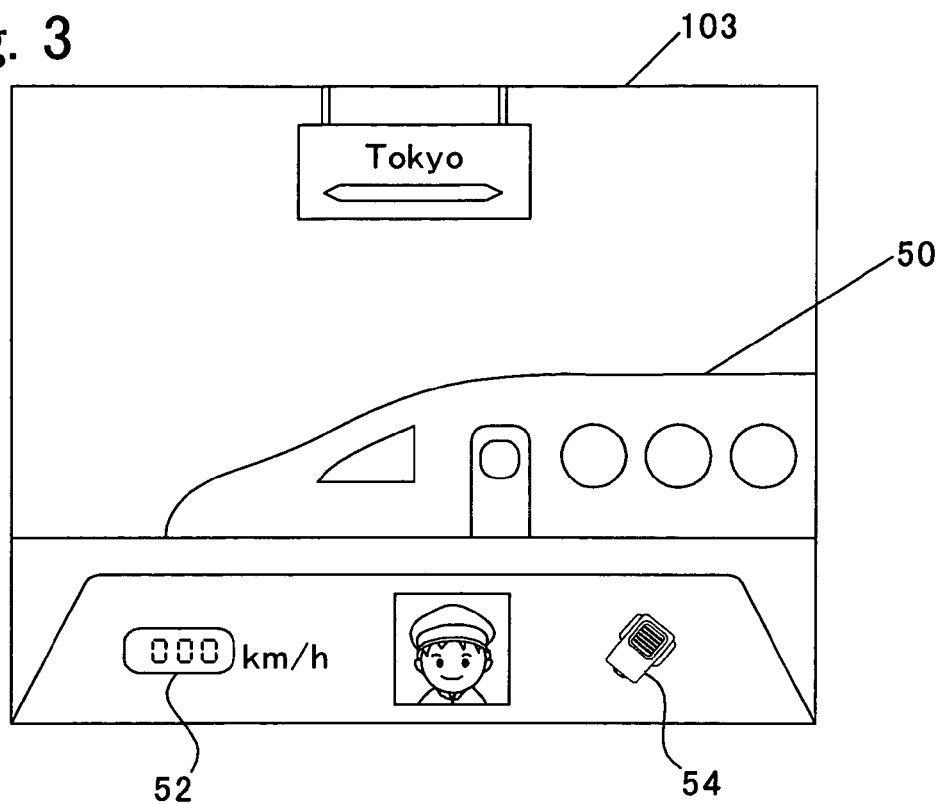
FIG. 3 is a view showing a departure screen displayed on the screen 103 of FIG. 1.

FIG. 3 is a view showing a departure screen displayed on the screen 103 of FIG. 1. As illustrated in FIG. 3, the departure screen is displayed by the game apparatus 1 on the screen 103 when the power switch 15 is turned on. The departure screen includes a train image 50, a speed displaying portion 52 and a microphone image 54. A speed of the train is displayed in the speed displaying portion 52. The microphone image 54 is an image for instructing a player to press the microphone switch 21 and input voice. The train image 50 starts moving when the player presses the microphone switch 21, inputs voice through the microphone 19, and also pulls the master control lever 3. Namely, the train starts moving.

Before the microphone image 54 is displayed, a door image (not shown) is displayed at the same place as the microphone image 54. The door image is an image for indicating the player to press the door switch 11 to close a door of the train image 50. The door is closed by pressing the door switch 11.

Figure 4:
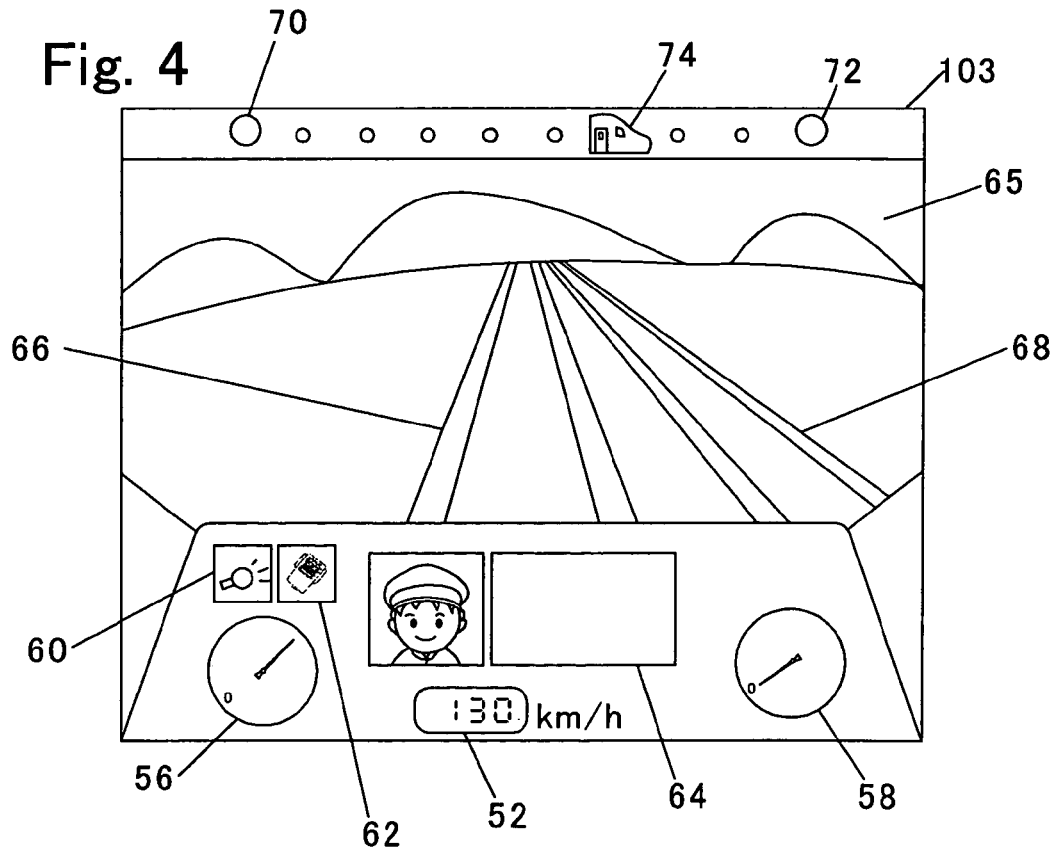
FIG. 4 is a view showing a running screen displayed on the screen 103 of FIG. 1.

FIG. 4 is a view showing a running screen displayed on the screen 103 of FIG. 1. As illustrated in FIG. 4, the running screen shows scenery to be seen from a driver's seat of the running train. Therefore, the running screen includes a scenery image 65 and rail images 66 and 68 to be seen from the driver's seat. In addition, the running screen includes a lighting indication portion 60, a microphone input indication portion 62, the speed displaying portion 52, a message displaying portion 64, a propulsion meter 56, and a braking meter 58. In addition, a start point object 70 is displayed on the left-hand top of the running screen, and an end point object 72 is displayed on the right-hand top of the running screen. In between, a running point indicating object 74 is displayed.

Change of the color of the lighting indication portion 60 indicates the player to turn lights on. When the player presses the light switch 7, an image in which lights are illuminating the front is displayed. Change of the color of the microphone input indication portion 62 indicates the player to input voice. When the player presses the microphone switch 21 and inputs voice through the microphone 19, the input voice is output from speakers (not shown) of the television monitor 100. When the player presses the alarm whistle switch 13, alarm whistle sound is output from the speakers (not shown) of the television monitor 100.

Various messages are given to the player by displaying them in the message displaying portion 64. For example, a message such as "turn on the wipers" is displayed. If the player presses the wiper switch 9, an image in which wipers are moving is displayed.

Returning to FIG. 2, the master control lever 3 is used for changing speed of the train. In this embodiment, there are three phases of speed. If the speed is in the first phase (the master control lever 3 is set to backmost), the propulsion is "0". If the speed is in the second phase (the master control lever 3 is pulled one phase from backmost), the propulsion is "1". If the speed is in the third phase (the master control lever 3 is pulled one phase from the second phase), the propulsion is "2". In case where the propulsion is "0", the propulsion does not work to the train. The propulsion "2" is stronger than the propulsion "1". The player can control speed of the train by operating the master control lever 3. If the speed of the train becomes faster, transition of the scenery image 65 becomes faster. On the other hand, if the speed of the train becomes slower, transition of the scenery image 65 becomes slower. The propulsion meter 56 of FIG. 4 changes on the basis of position of the master control lever 3. In other words, the needle of the meter 56 swings over in accordance with the propulsion.

The brake lever 5 is used for putting brake on the train. In this embodiment, the brake is set to three phases. In the first phase (the brake lever 5 is set to backmost), the braking force is "0". In the second phase (the brake lever 5 is rotated one phase from the position of the first phase), the braking force is "1". In the third phase (the brake lever 5 is rotated one phase from the position of the second phase), the braking force is "2". When the braking force is "0", the braking force does not act on the train. The braking force "2" is stronger than the braking force "1". The player can brake the train by operating the brake lever 5. After the player brakes the train, the train slows down and the scenery image 65 in response to the speed of the train is displayed on the screen 103. The braking force meter 58 of FIG. 4 changes according to the position of the brake lever 5. In other words, the needle of the meter 58 swings over in accordance with the braking force.

The start point object 70 in the running screen indicates a departure point, and the end point object 72 indicates a destination point. The running location indicating object 74 is used for indicating a current location of the train. Incidentally, double track is displayed on the running screen. One is referred as the rail 66 and the other is referred as the rail 68.

Figure 5:
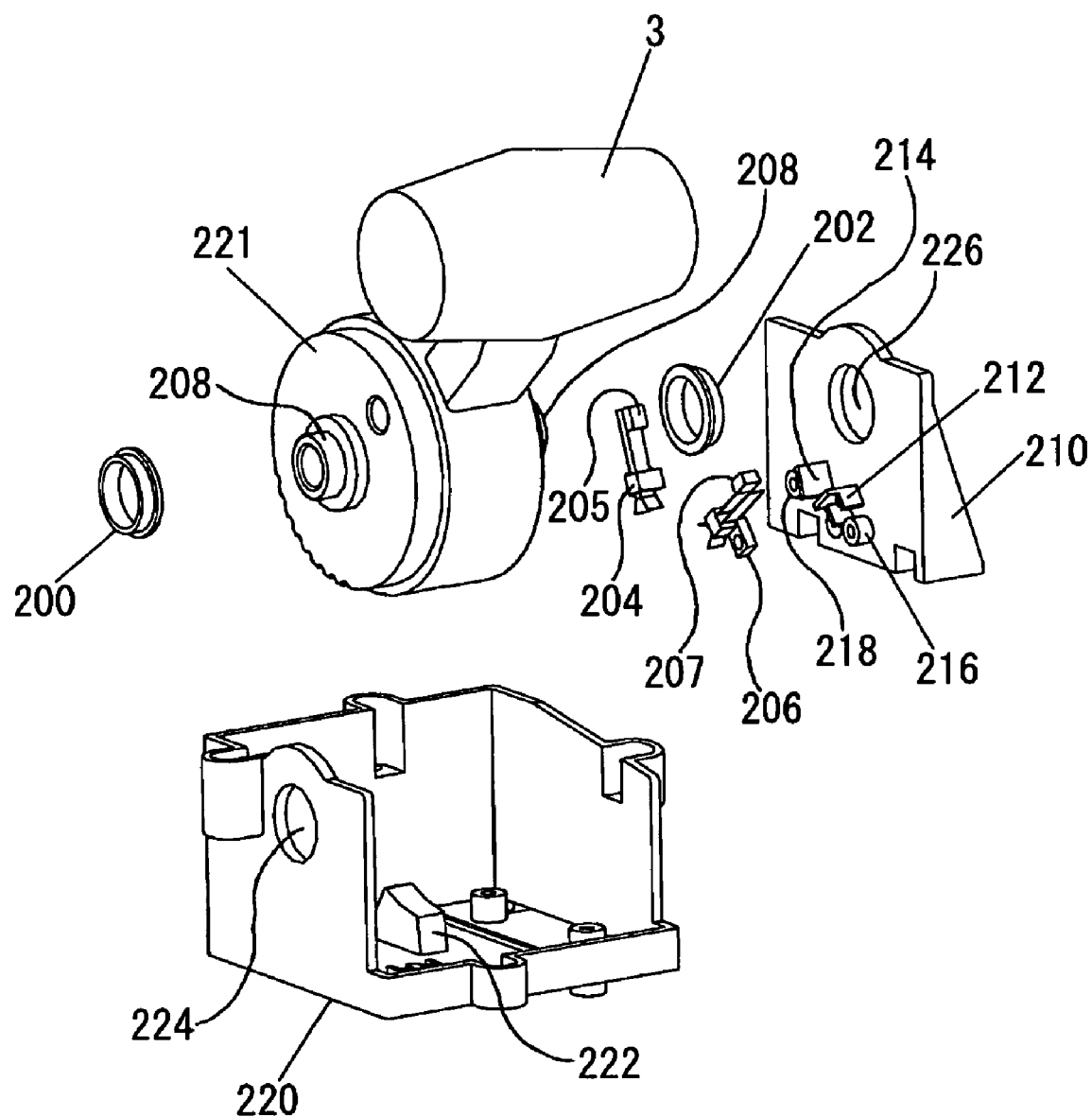
FIG. 5 is an exploded perspective view of the master control lever 3 of FIG. 5 and peripheral members.

FIG. 5 is an exploded perspective view of the master control lever 3 of FIG. 5 and peripheral members. As illustrated in FIG. 5, an axis 208 is formed in the center of both side faces of a base portion 221 of the master control lever 3. The master control lever 3 is, for example, made of polycarbonate. A supporting member 220 is provided with an aperture 224 on the left side face. A collar 200 is inserted from inside of the supporting member 220 to the aperture 224. A supporting member 210 is provided with an aperture 226 on the side face. A collar 202 is inserted from inside of the supporting member 201 to the aperture 226. For example, the supporting members 220 and 210 are made of ABS (acrylonitrile butadiene styrene) and the collars 200 and 202 are made of polyacetal.

The one end of the axis 208 is inserted to a hole of the collar 200 attached to the aperture 224 in the manner that the master control lever 3 can rotate. The other end of the axis 208 is inserted to a hole of the collar 202 attached to the aperture 226 in the manner that the master control lever 3 can rotate. The supporting member 210 is secured on the bottom portion of the supporting member 220. In this way, the master control lever 3 can rotate within a vertical plane. Incidentally, the collars 200 and 202 are attached to prevent resins (polycarbonate and ABS in this example) from being worn away caused from friction of resins. Therefore, the collars 200 and 202 are made of self-lubricating material.

A stopper 222 sticks out upwardly from the bottom portion of the supporting member 220. A function of the stopper 222 will be explained later. Holders 212 and 214 and bosses 216 and 218 are formed on inner side face of the supporting member 210. Leaf switches 206 and 204 are attached to the holding member 210 by the holders 212 and 214 and bosses 216 and 218. This will be explained in detail.

Figure 6:
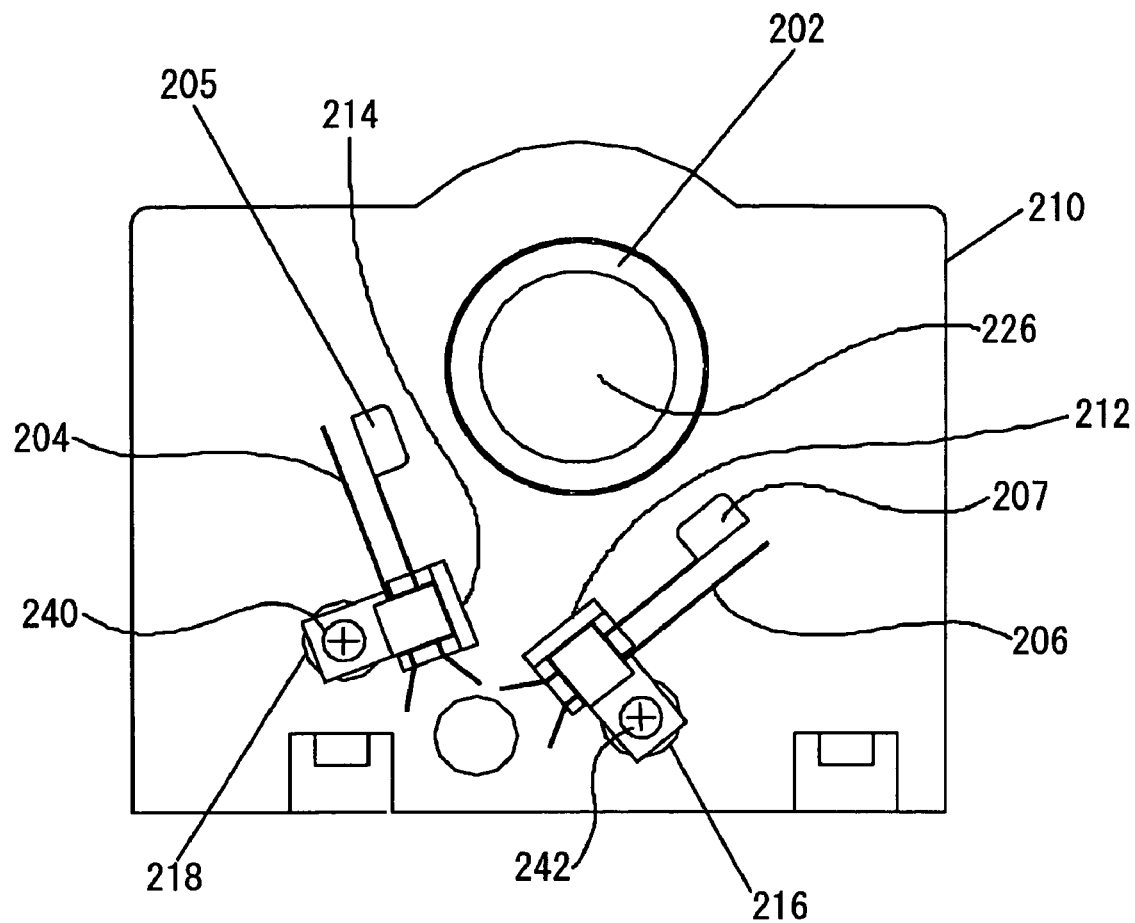
FIG. 6 is an explanatory view showing mounting condition of the leaf switches 204 and 206 of FIG. 5.

FIG. 6 is an explanatory view showing a mounting condition of the leaf switches 204 and 206 of FIG. 6. As illustrated in FIG. 6, the leaf switches 204 and 206 are respectively held by the holders 214 and 212. The leaf switch 204 is secured by screwing a screw 240 into the boss 218 in a manner that the base of the leaf switch 204 is nipped between them. In the same way, the leaf switch 206 is secured by screwing a screw 242 into the boss 216 in a manner that the base of the leaf switch 206 is nipped between them.

Figure 7:
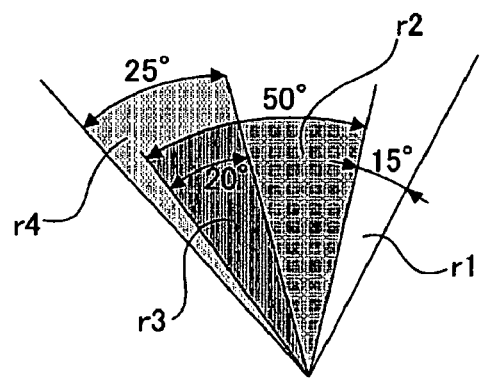
FIG. 7 is a view showing a relation between a rotation angle of the master control lever 3 of FIG. 2 and on/off states of the leaf switches 204 and 206.

FIG. 7 is a view showing a relation between a rotation angle of the master control lever 3 of FIG. 2 and on/off states of the leaf switches 204 and 206. As illustrated in FIG. 7, in case where the master control lever 3 is set within a range r1 (within a range of 15 degrees), the two leaf switches 204 and 206 are turned off. In case where the master control lever 3 is set within a range r2 (within a range of 50 degrees), the leaf switch 204 is turned on. In case where the master control lever 3 is set within a range r4 (within a range of 25 degrees), the leaf switch 206 is turned on. In case where the master control lever 3 is set within a range r3 (within a range of 20 degrees), the both two leaf switches 204 and 206 are turned on.

Figure 8:
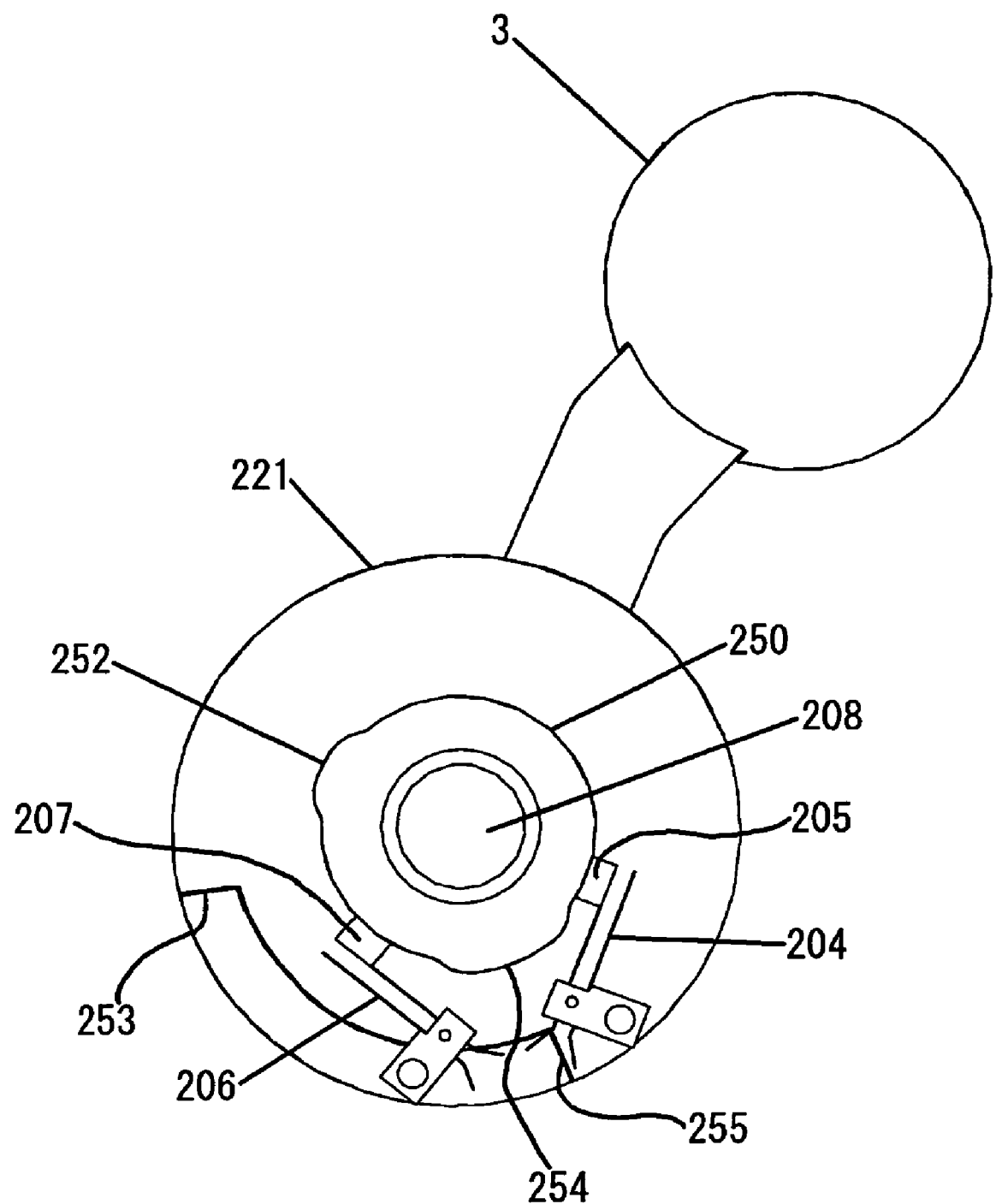
FIG. 8 is a view showing conditions of the leaf switches 204 and 206 when the master control lever 3 of FIG. 2 is set within the range r1 of FIG. 7.

FIG. 8 is a view showing conditions of the leaf switches 204 and 206 when the master control lever 3 of FIG. 2 is set within the range r1 of FIG. 7. As illustrated in FIG. 8, a cylindrical portion (sometimes referred as "a rotating body") 250 is formed on the center of the right side face (in case of the state of FIG. 5) of the base portion 221 of the master control lever 3. The axis 208 is formed in alignment with an axis line of the cylindrical portion 250. Projecting parts 252 and 254 are formed in such a manner as sticking out from the columnar surface (sometimes referred as "reference surface") of the cylindrical portion 250 in a vertical direction to the axis line. The cylindrical portion 250 where the projecting parts 252 and 254 are formed rotates with the axis 208 accompanying with the rotation of the master control lever 3.

If the master control lever 3 is set within the range r1, both leaf switches 204 and 206 are turned off since both contact members 205 and 207 of the leaf switches 204 and 206 come in contact with the columnar surface of the cylindrical portion 250. In this case, since the stopper 222 of FIG. 5 hits an edge portion 255 formed at the base portion of the master control lever 3, the master control lever 3 can not be rotated clockwise (in case of FIG. 8) anymore. Incidentally, FIG. 8 is showing a condition where the master control lever 3 is set to the first phase (the propulsion "0").

Figure 9:
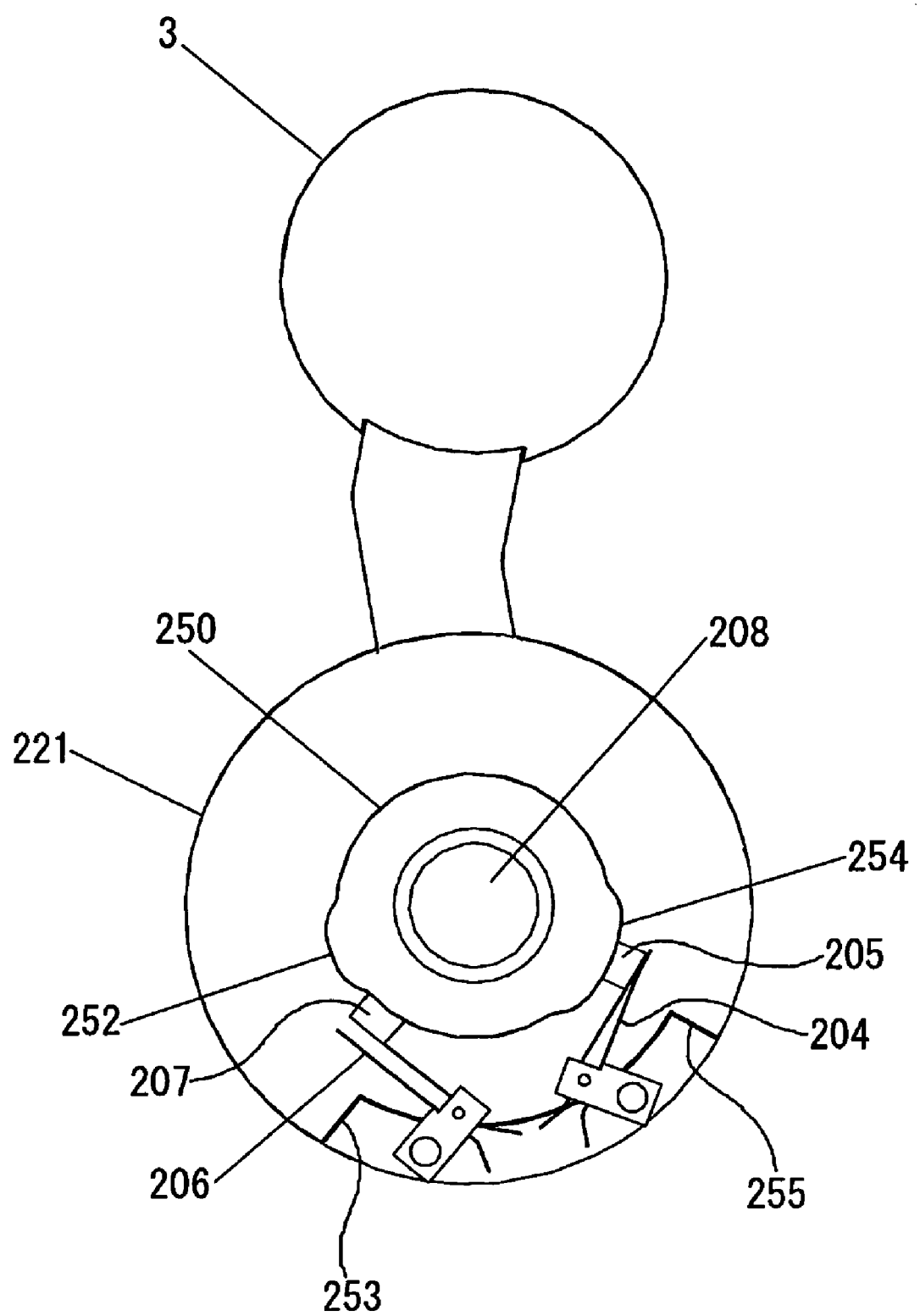
FIG. 9 is a view showing a condition of the leaf switches 204 and 206 when the master control lever 3 of FIG. 2 is set to within the range (r2-r3) of FIG. 7.

FIG. 9 is a view showing a condition of the leaf switches 204 and 206 when the master control lever 3 of FIG. 2 is set to within the range (r2-r3) of FIG. 7. The range (r2-r3) is the range r2 with the range 3 removed. As illustrated in FIG. 9, when the master control lever 3 is set to within the range (r2-r3), contact portions of the leaf switch 204 contact with each other since the contact member 205 of the leaf switch 204 is pushed by the projecting part 254. Therefore, the leaf switch 204 is turned on. On the other hand, the leaf switch 206 is off since the contact member 207 of the leaf switch 206 contacts with the columnar surface of the cylindrical portion 250. Incidentally, FIG. 9 is showing a condition where the master control lever 3 is set to the second phase (the propulsion "1").

Figure 10:
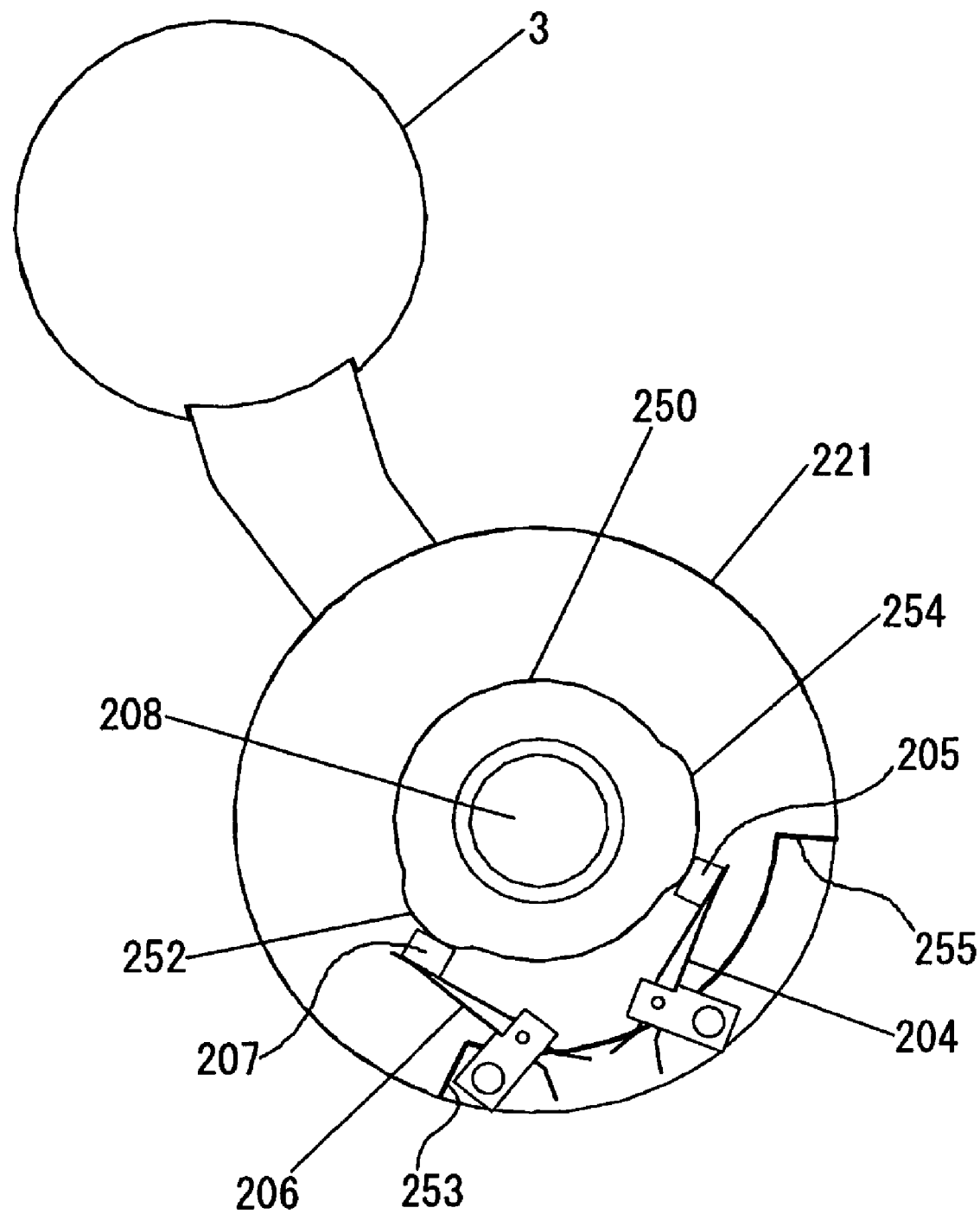
FIG. 10 is a view showing a condition of the leaf switches 204 and 206 when the master control lever 3 of FIG. 2 is set to within the range r3 of FIG. 7.

FIG. 10 is a view showing a condition of the leaf switches 204 and 206 when the master control lever 3 of FIG. 2 is set to within the range r3 of FIG. 7. As illustrated in FIG. 10, when the master control lever 3 is set to within the range r3, the leaf switch 204 is turned on since the contact portions of the leaf switch 204 come in contact with each other because the contact member 205 of the leaf switch 204 is pushed by the projecting part 254. At the same time, the leaf switch 206 is also turned on since contact portions of the leaf switch 206 contact with each other because the contact member 207 of the leaf switch 206 is pushed by the projecting part 252. Incidentally, FIG. 10 is showing a condition where the master control lever 3 is set to the third phase (the propulsion "2"). In case where the leaf switches 204 and 206 are both turned on, the leaf switch 206 is prioritized.

Figure 11:
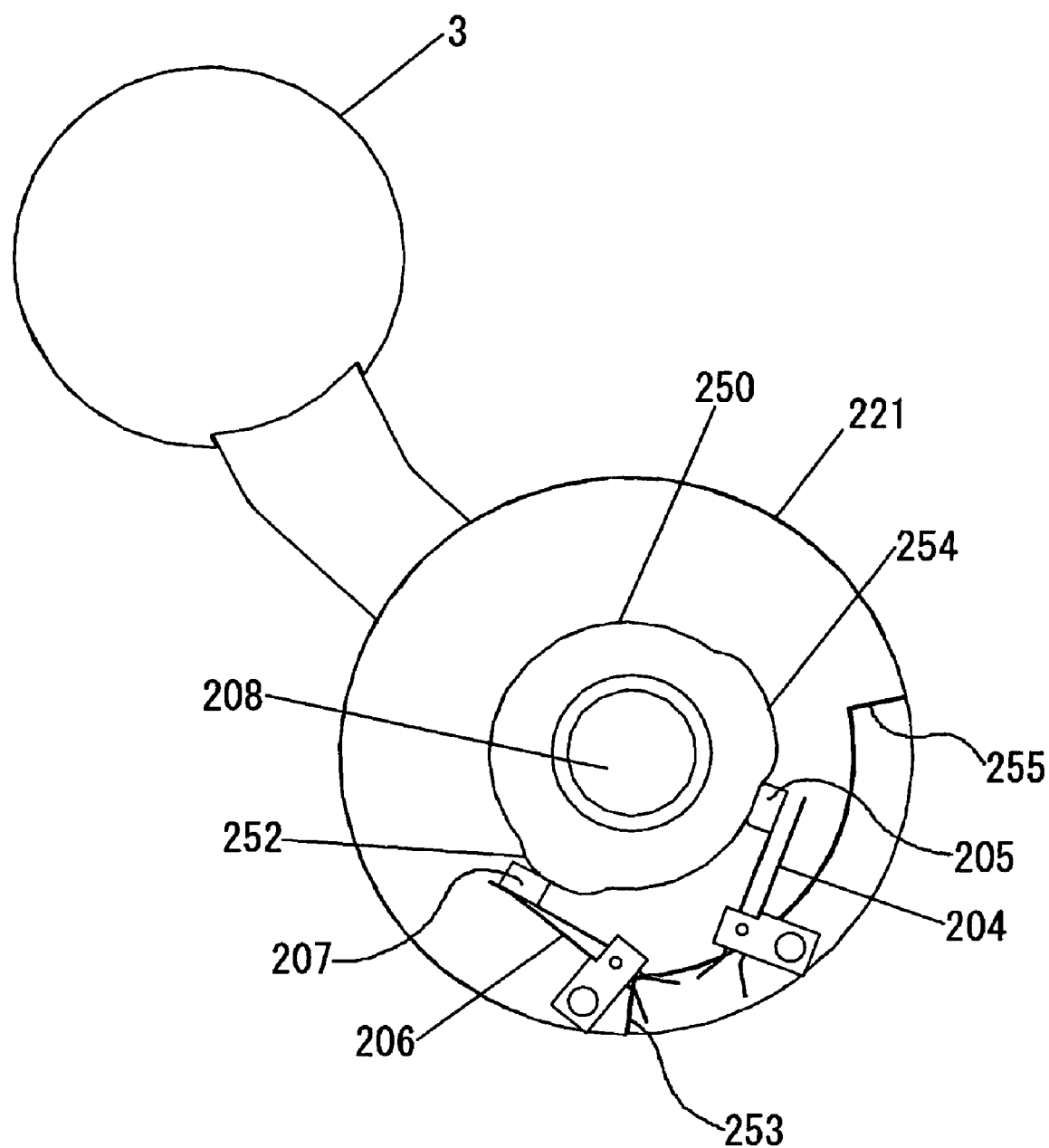
FIG. 11 is a view showing a condition of the leaf switches 204 and 206 when the master control lever 3 of FIG. 2 is set to within the range (r4-r3) of FIG. 7.

FIG. 11 is a view showing a condition of the leaf switches 204 and 206 when the master control lever 3 of FIG. 2 is set to within the range (r4-r3) of FIG. 7. The range (r4-r3) is the range r4 with the range r3 removed. As illustrated in FIG. 11, when the master control lever 3 is set to within the range (r4-r3), the leaf switch 206 is turned on since the contact portions of the leaf switch 206 contact with each other because the contact member 207 of the leaf switch 206 is pushed by the projecting part 252. On the other hand, the leaf switch 204 is turned off since the contact member 205 of the leaf switch 204 contacts with the columnar surface of the cylindrical portion 250. In this case, since the stopper 222 of FIG. 5 hits an edge portion 253 formed at the base portion of the master control lever 3, the master control lever 3 can not be rotated counterclockwise (in case of FIG. 11) anymore. Incidentally, FIG. 11 is showing a condition where the master control lever 3 is set to the third phase (the propulsion "2").

Figure 12:
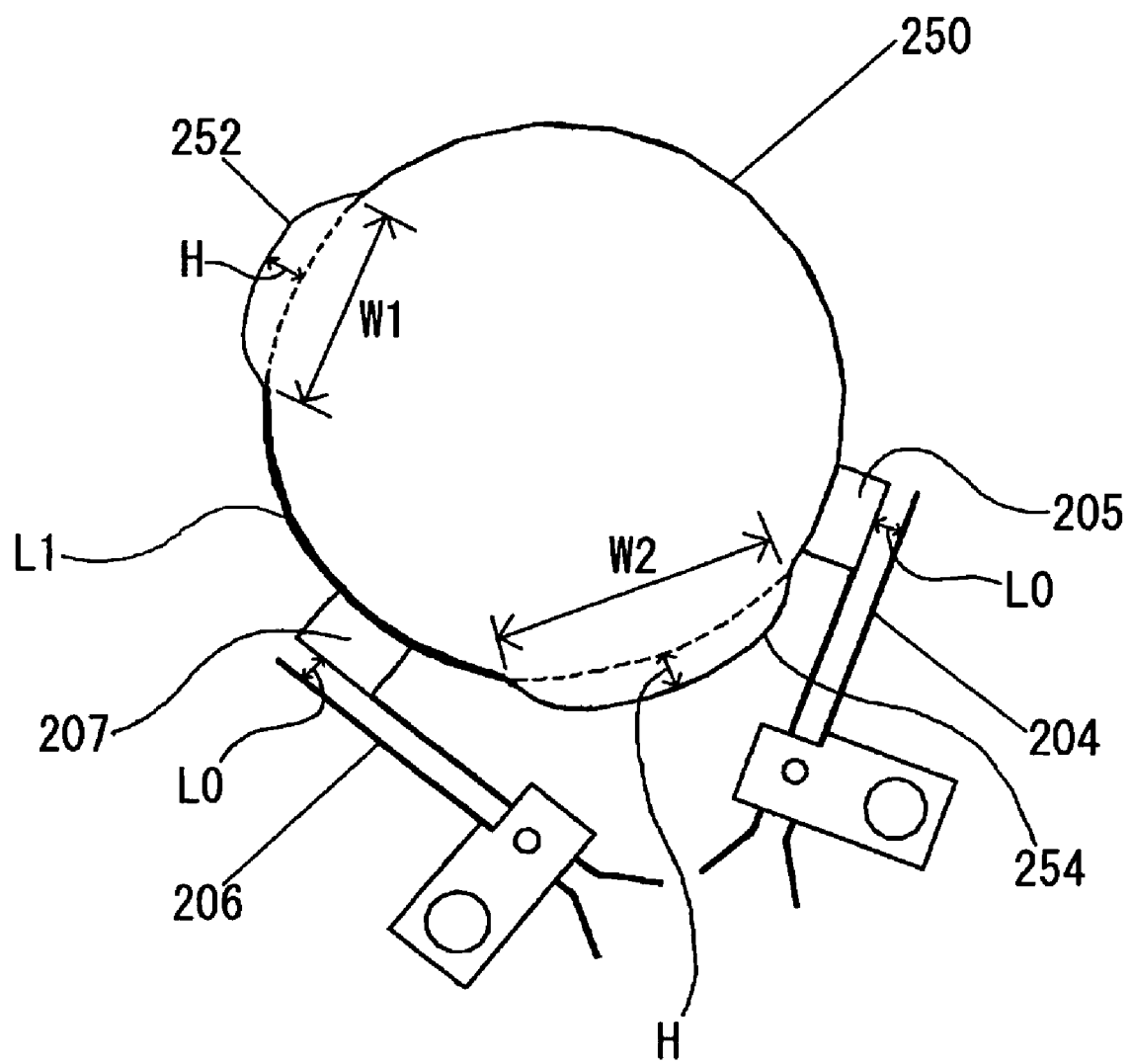
FIG. 12 is an explanatory view showing the cylindrical portion 250 formed at the base portion 221 of the master control lever 3 of FIG. 8 to FIG. 11.

FIG. 12 is an explanatory view showing the cylindrical portion 250 formed at the base portion 221 of the master control lever 3 of FIG. 8 to FIG. 11. As illustrated in FIG. 12, the height "H" of the projecting part 254 is made higher than an interval "L0" between contact portions of the leaf switch 204. In the same way, the height "H" of the projecting part 252 is made higher than an interval "L0" between contact portions of the leaf switch 206. In this way, it is possible to turn the leaf switches 204 and 206 on without fail. For example, it is possible to determine how high the height "H" should be than the interval "L0" from designer's own experiences. In this case, the height "H" should not be too high because the leaf switches 204 and 206 might not be able to recover their original state.

In addition, it is possible to adjust an area of the range r4 of FIG. 7 by adjusting the width "W1" of the projecting part 252 and the position of the edge 253. It is also possible to adjust an area of the range r2 of FIG. 7 by adjusting the width "W2" of the projecting part 254. Furthermore, it is possible to adjust an area of the range r3 of FIG. 7 by adjusting the interval "L1" between the projecting parts 252 and 254. Still further, it is possible to adjust an area of the range r1 of FIG. 7 by adjusting the position of the edge 255 of the cylindrical portion 250 and the width "W2" of the projecting part 254.

The master control lever 3 has been explained accompanying with FIG. 5 to 12. Incidentally, the brake lever 5 controls on/off of two leaf switches 340 and 342 (to be explained later) and enables to set three phases using same mechanism as the master control lever 3

Figure 13:
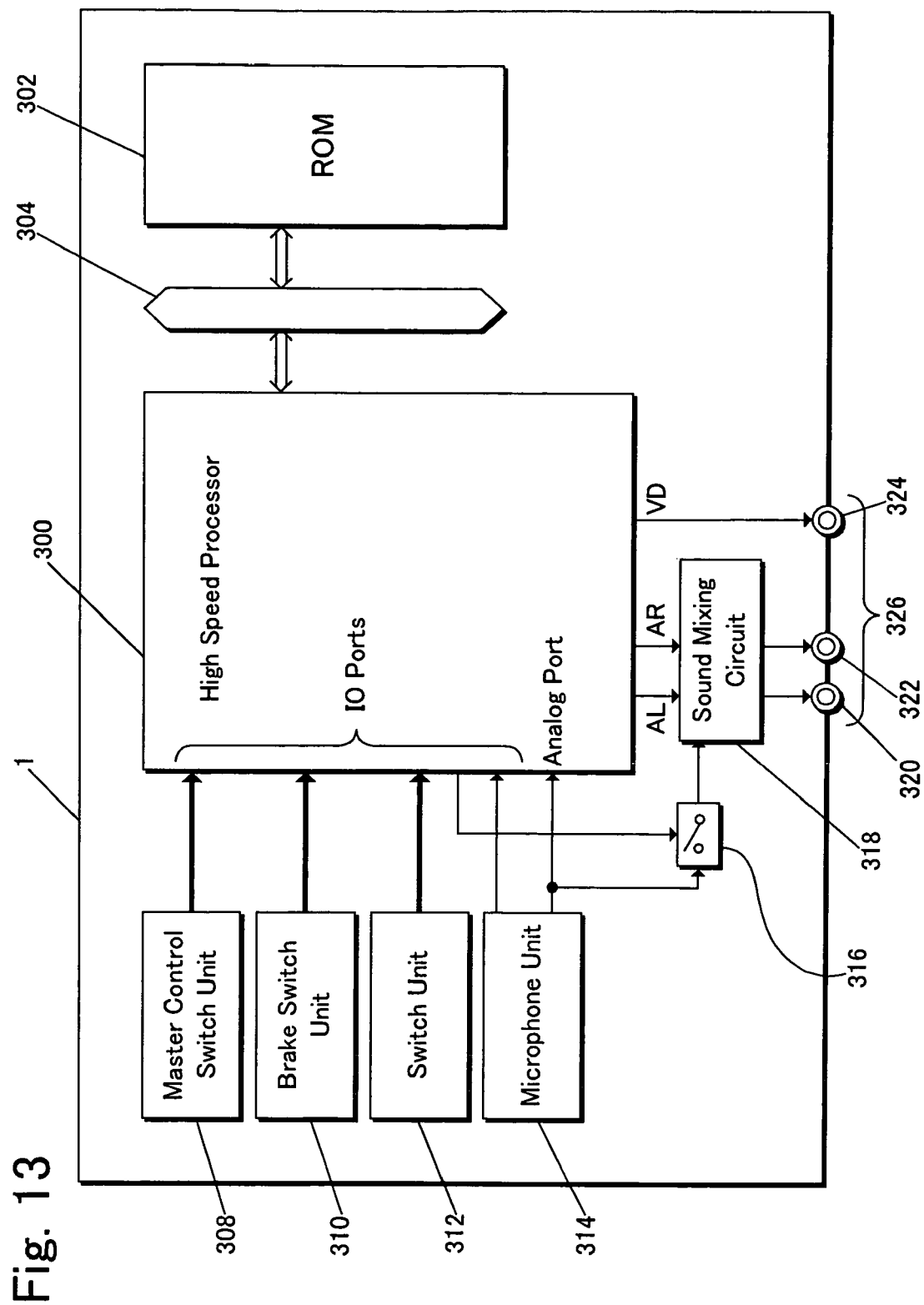
FIG. 13 is a view showing an electrical structure of the game apparatus 1 of FIG. 2.

FIG. 13 is a view showing an electrical structure of the game apparatus 1 of FIG. 2. FIG. 14A is a circuit diagram of a master control switch unit 308 of FIG. 13. FIG. 14B is a circuit diagram of a brake switch unit 310 of FIG. 13. FIG. 14C is a circuit diagram of a switch unit 312 of FIG. 13. FIG. 15 is a circuit diagram of a microphone unit 314 of FIG. 13.

As illustrated in FIG. 13, the game apparatus 1 includes a high speed processor 300, a ROM 302, a bus 304, the master control switch unit 308, the brake switch unit 310, the switch unit 312, the microphone unit 314, a switch 316, a sound mixing circuit 318 and the AV terminal 326. The AV terminal 326 includes audio terminals 320 and 322 and a video terminal 324.

The high speed processor 300 includes various processors such as an arithmetic processor, a graphic processor, a sound processor and a DMA processor, and also includes an A/D converter for receiving an analog signal, an input and output control circuit which receives input signals such as switch operation signals and also outputs output signals to external devices (not shown).

The high speed processor 300 is provided with an inner memory (not shown). The inner memory serves as a temporary memory, a working memory, a counter, a register area (temporary data area) and/or a flag area. The ROM 302 is connected to the high speed processor 300 via the bus 304. A game program, image data and so on are stored in the ROM 302.

The high speed processor 300 performs various processing such as calculation, graphic process and sound process in accordance with the game program stored in the ROM 302 and generates a video signal VD and audio signals AL and AR. The video signal VD is an image signal for displaying a game screen (refer to FIG. 3 and FIG. 4). The audio signals AL and AR are signals for outputting game music and effective sounds. Due to these signals, the game screen is displayed on the screen 103 of the television monitor 100 and necessary sounds (such as effective sounds and game music) are output from speakers (not shown).

As illustrated in FIG. 14A, the master control switch unit 308 comprises the leaf switches 204 and 206, and a power voltage Vcc is applied to one contact point of each leaf switch 204 and 206. The other contact point of each leaf switch 204 and 206 is respectively connected to input/output ports (I/O ports) IO0 and IO1 of the high speed processor 300. Consequently, the arithmetic processor receives on/off information of the leaf switches 204 and 206 via the input and output control circuit, and performs corresponding process.

In other words, when the leaf switch 204 is turned on, the input/output port IO0 becomes high level, and when the leaf switch 206 is turned on, the input/output port IO1 becomes high level. The high speed processor 300 judges whether the leaf switches 204 and 206 are turned on in accordance with values of the input/output ports IO0 and IO1, and then generates the video signal VD corresponding to the set propulsion.

As illustrated in FIG. 14B, the brake switch unit 310 comprises the leaf switches 340 and 342, and the power voltage Vcc is applied to one contact point of each leaf switch 340 and 342. The other contact point of each leaf switch 340 and 342 is respectively connected to input/output ports IO2 and IO3 of the high speed processor 300. Consequently, the arithmetic processor receives on/off information of the leaf switches 340 and 342 via the input and output control circuit, and performs corresponding process.

In other words, when the leaf switch 340 is turned on, the input/output port IO2 becomes high level, and when the leaf switch 342 is turned on, the input/output port IO3 becomes high level. The high speed processor 300 judges whether the leaf switches 340 and 342 are turned on in accordance with values of the input/output ports IO2 and IO3, and then generates the video signal VD corresponding to the set braking force.

As illustrated in FIG. 14C, the switch unit 312 includes the light switch 7, the wiper switch 9, the door switch 11 and the alarm whistle switch 13. The power voltage Vcc is applied to one contact point of each switch. The other contact points of switches 7, 9, 11 and 13 are respectively connected to input/output ports IO4, IO5, IO6 and IO7 of the high speed processor 300. Consequently, the arithmetic processor receives on/off information of the switches 7, 9, 11 and 13 via the input and output control circuit, and performs corresponding process.

As illustrated in FIG. 15, the microphone unit 314 includes the microphone switch 21, the microphone 19, resistance elements 344 and 346 and a voice amplifier 348. One contact point of the microphone switch 21 is grounded, and the other contact point is connected to the power supply Vcc via the resistance element 344 and also connected to an input/output port IO8 of the high speed processor 300. Consequently, the arithmetic processor receives on/off information of the microphone switch 21 via the input and output control circuit, and performs corresponding process.

One terminal of the microphone 19 is grounded, and the other terminal is connected to the power supply Vcc via the resistance element 346 and also connected to the voice amplifier 348. As illustrated in FIG. 13, an output terminal of the voice amplifier 348 is connected to an analog port of the high speed processor 300 and the switch 316.

When the microphone switch 21 is pressed, the input/output port IO8 becomes low level. Then, the high speed processor 300 turns the switch 316 of FIG. 13 on. Therefore, the voice signal amplified by the voice amplifier 348 is input to not only the analog port of the high speed processor 300 but also the sound mixing circuit 318. The sound mixing circuit 318 synthesizes the audio signals AL and AR and the voice signal from the microphone 21 and outputs them to the audio terminals 320 and 322. Consequently, the voice from the microphone 19 is output from the speakers of the television monitor 100. The video signal VD is output to the video terminal 324.

On the other hand, when the microphone switch 21 is turned off, the input/output port IO8 becomes high level. Then, the high speed processor 300 turns the switch 316 of FIG. 13 off. Consequently, since the voice is not input to the sound mixing circuit 318 even if the voice is input from the microphone 19, the voice from the microphone 19 is not output from the speakers of the television monitor 100.

As explained in FIG. 3, the high speed processor 300 generates the video signal VD which makes the train image 50 move only when the voice is input from the microphone 19 (i.e. a signal above a certain level is input to the analog port) while the microphone switch 21 is turned on (i.e. the port IO8 is low level), and also one of or both the leaf switches 204 and 206 of the master control switch unit 308 is/are turned on (i.e. one of or both ports IO0 and IO1 is/are high level).

In above explanation, the leaf switches 204 and 206 are used for detecting operation of the master control lever 3. Alternatively, it is possible to use rubber switches 400 and 402 instead of the leaf switches 204 and 206.

Figure 16:
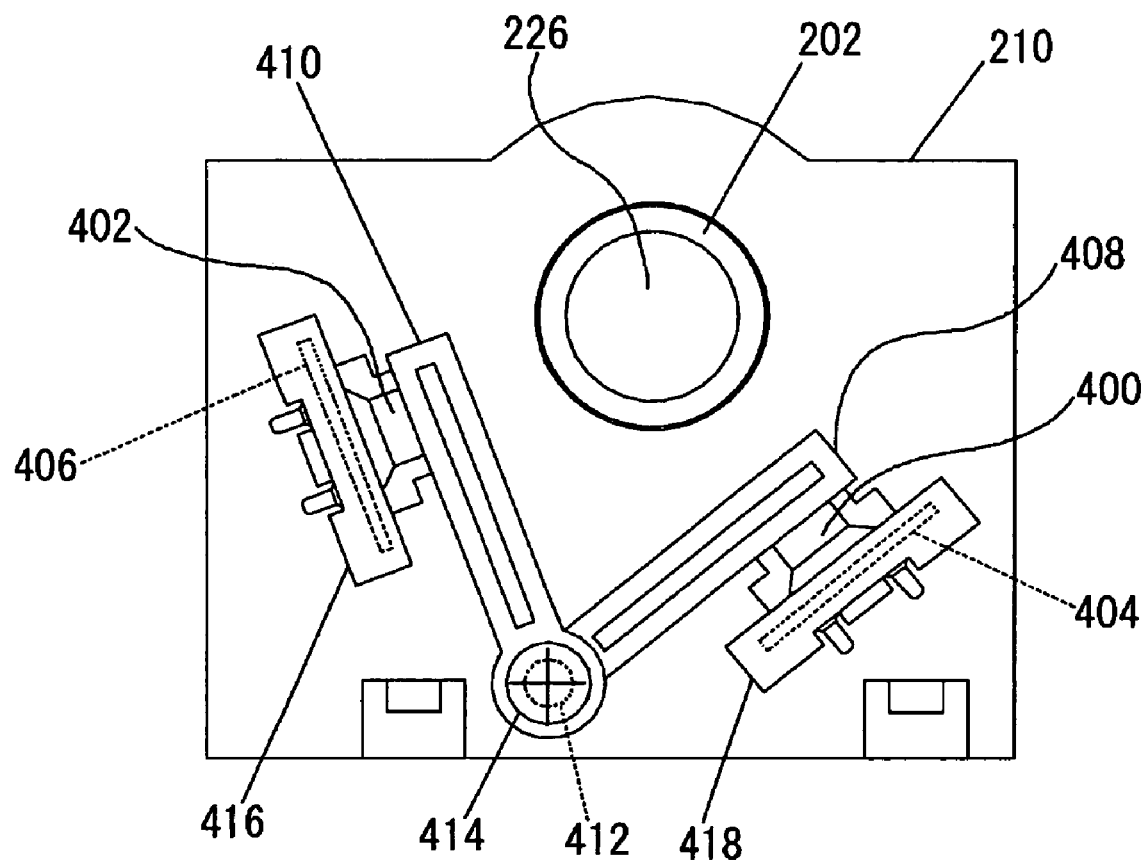
FIG. 16 is an explanatory view showing other mechanism for detecting operation of the master control lever 3 of FIG. 2.

FIG. 16 is an explanatory view showing other mechanism for detecting operation of the master control lever 3 of FIG. 2. As illustrated in FIG. 16, holders 416 and 418 are formed on the side face of the supporting member 210. Each substrate 406 and 404 having a contact portion is held by the holder 416 and 418. Then, the rubber switches 402 and 400 are respectively attached to the substrates 406 and 404.

In addition, an axis 412 is formed on the side face of the supporting member 210, and inserted to holes formed at base end portion of rods 408 and 410. The rods 408 and 410 can rotate around the axis 412. Incidentally, a screw 414 is used in order to prevent the rods 408 and 410 from dropping out.

Figure 17:
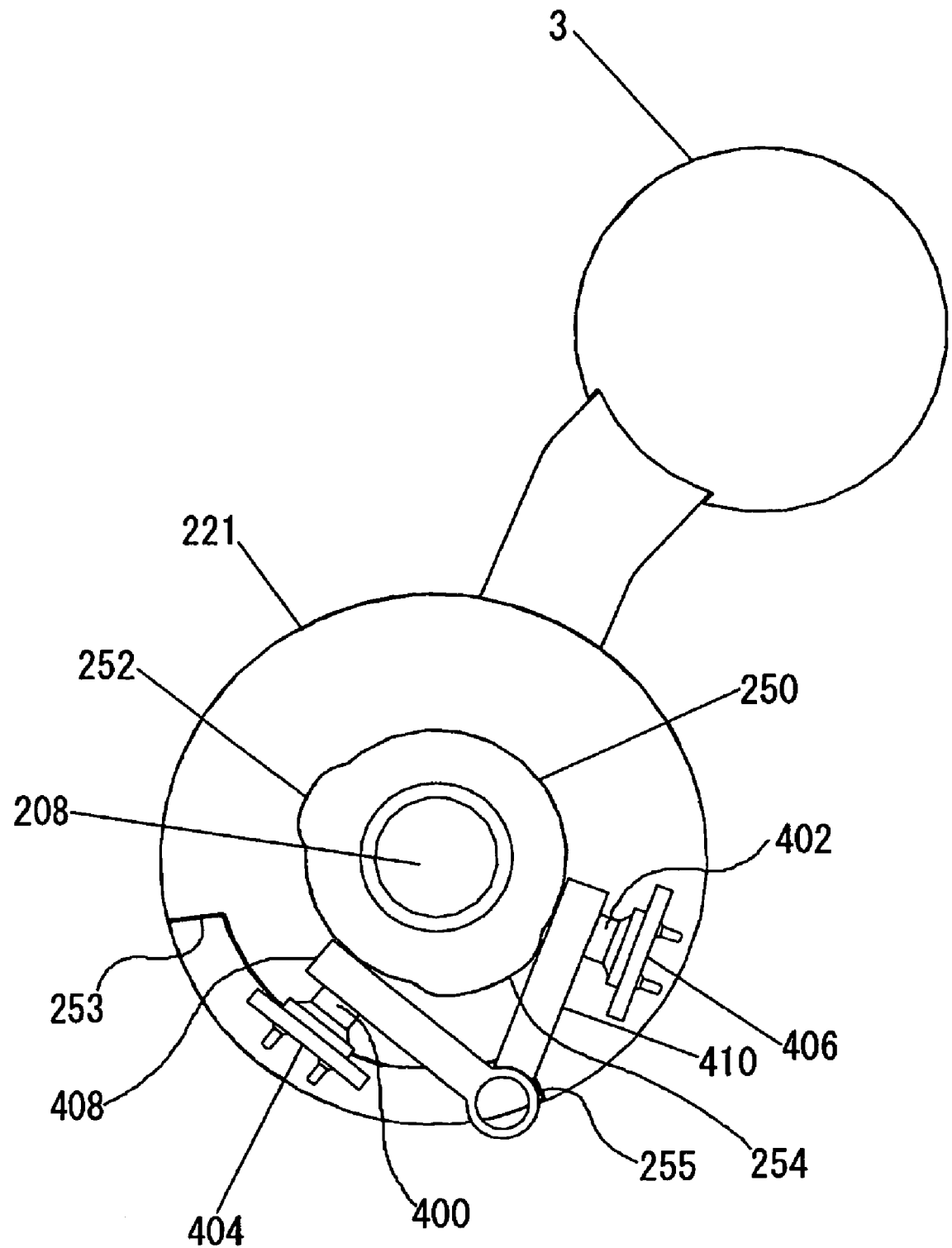
FIG. 17 is an explanatory view of detecting operation of the master control lever 3 using the mechanism of FIG. 16.

FIG. 17 is an explanatory view of detecting operation of the master control lever 3 using the mechanism of FIG. 16. As illustrated in FIG. 17, since the rods 408 and 410 contact with the columnar surface of the cylindrical portion 250 when the master control lever 3 is set to within the range r1, the rubber switches 400 and 402 are turned off. When the master control lever 3 is set to within the range (r2-r3), the rubber switch 402 is turned on since the rod 410 is pushed by the projecting part 254. On the other hand, the rubber switch 400 is turned off since the rod 408 contacts with the columnar surface of the cylindrical portion 250.

When the master control lever 3 is set to within the range r3, both rubber switches 402 and 400 are turned on since both rod 410 and 408 are pushed by corresponding projecting parts 254 and 252. When the master control lever 3 is set to within the range (r4-r3), the rubber switch 400 is turned on since the rod 408 is pushed by the projecting part 252. On the other hand, the rubber switch 402 is turned off since the rod 410 contacts with the columnar surface of the cylindrical portion 250.

Generally, a rubber switch might not be able to recover its original shape and cause an inconvenience that an "on" state is maintained if the rubber switch is left pushed for a long period. Therefore, a leaf switch is favorable to be used rather than the rubber switch since the inconvenience like this does not happen in case of the leaf switch.

The mechanism described in FIG. 16 and FIG. 17 can be also used for the brake lever 5.

As has been discussed above, the contact members 205 and 207 of the leaf switch 204 and 206 are pushed by the projecting parts 254 and 252 which rotates with the axis 208 of the master control lever 3 so that the contact portions of each leaf switch 204 and 206 contact with each other. Therefore, it is possible to detect operation of the master control lever 3 in accordance with on/off information of the leaf switches 204 and 207 accompanying with the rotation of the master control lever 3. In this way, operation of the master control lever 3 is detected without using a rotary switch.

In this embodiment, the height "H" of the projecting parts 252 and 254 of the cylindrical portion 250 are higher than the interval "L0" between the contact portions of each leaf switch 206 and 204. Therefore, in case where the axis 208 oscillates, it is possible to make the contact portions of each leaf switch 206 and 204 contact with each other without fail.

In addition, the contact members 205 and 207 are attached on the tip end portions of the leaf switches 204 and 206, and the projecting parts 254 and 252 of the cylindrical portion 250 are formed with rotundate corners. In this way, it is possible to unctuously switch the leaf switches 204 and 206 on and off.

Furthermore, the game apparatus 1 is a video game controller having the processor 300 in this embodiment. Therefore, it is possible to reduce the cost and improve the convenience of the users as compared with the case where a game apparatus and a video game controller are separately provided.

In addition, the game apparatus 1 is provided with the microphone 19 for inputting player's voice in this embodiment. Therefore, it is possible to enhance game contents since the high speed processor 300 can perform process in response to microphone input.

Incidentally, the present invention is not limited to the above embodiment, and a variety of variations and modifications may be effected without departing from the spirit and scope thereof, as described in the following exemplary modifications.

(1) In above description, two leaf switches 204 and 206 and two projecting parts 252 and 254 corresponding to two leaf switches 204 and 206 are used. However, the numbers of the leaf switches and the projecting parts are not limited thereto. It is possible to form more than three leaf switches and more than three projecting parts. It is possible to detect the operation of the master control lever 3 in more detail by increasing the numbers of the leaf switches and the projecting parts. Alternatively, it is possible to form only one leaf switch and one projecting part. These apply to a configuration using the rubber key as well.

(2) In above description, the direction of the tip end portion of the leaf switch 206 (in case of FIG. 8, clockwise rotating direction) and the direction of the tip end portion of the leaf switch 204 (in case of FIG. 8, counter clockwise rotating direction) are different. However, the leaf switches 204 and 206 can be mounted in same direction.

(3) In above description, when the leaf switches 204 and 206 are turned off, the contact members 205 and 207 contact with the columnar surface of the cylindrical portion 250. However, the contact members 205 and 207 can be away from the columnar surface.

(4) In the example of FIG. 16 and FIG. 17, the rods 408 and 410 rotate around the same axis 412. However, it is possible to provide axes separately for each rod 408 and 410 to rotate. The direction of the tip end portion of the rod 408 (in case of FIG. 17, clockwise rotating direction) and the direction of the tip end portion of the rod 410 (in case of FIG. 17, counter clockwise rotating direction) are different. However, the rods 408 and 410 can be mounted in same direction. In this case, each rod 408 and 410 is provided with own rotation axis.

(5) Alternatively, it is possible to use a microswitch instead of the leaf switch and the rubber switch.

(6) While any appropriate processor can be used as the processor 300 of FIG. 13, it is preferred to use the high speed processor in relation to which the applicant has been filed patent applications. The details of this high speed processor are disclosed, for example, in Jpn. unexamined patent publication No. 10-307790 and U.S. Pat. No. 6,070,205 corresponding thereto.

The invention has been described in detail above based on the embodiment, but it will be obvious to those skilled in the art that the invention is not limited to the embodiment described in the present application. The invention can be embodied in modified and changed modes without departing from the spirit and scope of the invention as defined by the appended claims. Accordingly, the description of the invention is intended for purposes of illustration and is in no way intended to limit the invention.

What is claimed is:

1. A video game controller, comprising:
  a lever having an axis portion operable to rotate around an axis line;
  a rotating body adapted to rotate around the axis line with the axis portion, said rotating body having at least one projecting part; and
  at least one switch arranged around said rotating body, said at least one switch having a first metal plate and a second metal plate, wherein a tip end portion of the first metal plate and a tip end of the second metal plate constitute contact portions of said switch, and a base end portion of the first metal plate and a base end portion of the second metal plate are secured in such a state that they are electrically insulated from each other, and said switch is arranged in such a manner that the contact portions of said switch contact each other only when the tip end portion of the first metal plate of said switch comes in contact with the projecting part of said rotating body.

2. The video game controller as claimed in claim 1, wherein the first metal plate of said at least one switch has a contact member attached to the tip end portion on an opposite side of the contact portion, and wherein said at least one switch is arranged in such a manner that the contact portions of said at least one switch contact each other only when the contact member of said switch comes in contact with the projecting part of said rotating body, and the projecting part of said rotating body sticks out from said rotating body and is formed with curved corners.

3. The video game controller as claimed in claim 1 further comprising a processor which generates a video signal and an audio signal in accordance with a game program.

4. The video game controller as claimed in claim 3 further comprising a microphone for inputting a player's voice.

5. A hand-operated video game controller, comprising:
  a lever having an axis portion operable to rotate around an axis line;
  a rotating body adapted to rotate around the axis line with the axis portion; and
  a plurality of switches arranged around said rotating body, wherein said rotating body is provided with a plurality of projecting parts,
  wherein each of the projecting parts is operable to come in contact with any one of said plurality of switches in response to rotation of said rotating body, and wherein the switch which the projecting part comes in contact with turns on, wherein the projecting parts and said plurality of switches are arranged in such a manner that at least two switches are operable to be turned on at the same time and to be turned on separately depending on rotation of said rotating body, wherein the at least two switches adjoin each other, and wherein the hand-operated video game controller further comprises a processor operable to determine in accordance with a predetermined rule that one of the at least two switches is valid when the at least two switches turn on at the same time.

6. The hand-operated video game controller as claimed in claim 5, wherein a period of the switch being in a on state is adjustable by adjusting widths of the projecting parts in a rotating direction of the rotating body.

7. The hand-operated video game controller as claimed in claim 5, wherein each of said plurality of switches comprises a first metal plate and a second metal plate, and wherein a tip end portion of the first metal plate and a tip end portion of the second metal plate constitute contact portions of the switch, and a base end portion of the first metal plate and a base end portion of the second metal plate are secured in such a way that they are electrically insulated from each other.

8. The hand-operated video game controller as claimed in claim 7, wherein the first metal plate of the switch has a contact member attached to the tip end portion on an opposite side of the contact portion, the contact portions of the switch contact each other when the contact member comes in contact with the projecting part, and the projecting part is formed with curved corners.

9. The hand-operated video game controller as claimed in claim 5, wherein each of the plurality of switches is any one of a leaf switch, a rubber switch, and a microswitch.

10. The hand-operated video game controller as claimed in claim 5, further comprising a processor operable to generate a video signal and an audio signal in accordance with a game program.

11. The hand-operated video game controller as claimed in claim 5, further comprising a microphone for inputting a player's voice.

* * * * *